United States Patent
Wang

(10) Patent No.: US 10,188,227 B2
(45) Date of Patent: Jan. 29, 2019

(54) VASE ARTICLE WITH IMITATIVE CERAMIC EFFECT

(71) Applicant: Yi Wang, Shenzhen (CN)

(72) Inventor: Yi Wang, Shenzhen (CN)

( * ) Notice: Subject to any disclaimer, the term of this patent is extended or adjusted under 35 U.S.C. 154(b) by 0 days.

(21) Appl. No.: 15/467,916

(22) Filed: Mar. 23, 2017

(65) Prior Publication Data
US 2017/0188726 A1  Jul. 6, 2017

Related U.S. Application Data

(60) Continuation-in-part of application No. 15/169,289, filed on May 31, 2016, which is a continuation-in-part of application No. 14/044,404, filed on Oct. 2, 2013, now abandoned, which is a division of application No. 13/426,248, filed on Mar. 21, 2012, now abandoned.

(30) Foreign Application Priority Data

Apr. 13, 2016 (CN) .......................... 2016 1 0240805

(51) Int. Cl.
| | |
|---|---|
| *A47G 7/06* | (2006.01) |
| *A01G 9/02* | (2018.01) |
| *C09D 7/47* | (2018.01) |
| *B05D 5/06* | (2006.01) |
| *B05D 7/00* | (2006.01) |
| *B44F 11/06* | (2006.01) |
| *C09D 5/02* | (2006.01) |
| *C09D 5/28* | (2006.01) |
| *C09D 133/06* | (2006.01) |
| *C09D 133/08* | (2006.01) |
| *C09D 5/12* | (2006.01) |
| *C09D 7/40* | (2018.01) |
| *B05D 7/02* | (2006.01) |
| *C08L 1/28* | (2006.01) |

(52) U.S. Cl.
CPC ............... *A47G 7/06* (2013.01); *A01G 9/021* (2013.01); *B05D 5/06* (2013.01); *B05D 7/574* (2013.01); *B44F 11/06* (2013.01); *C09D 5/022* (2013.01); *C09D 5/027* (2013.01); *C09D 5/12* (2013.01); *C09D 5/28* (2013.01); *C09D 7/40* (2018.01); *C09D 7/47* (2018.01); *C09D 133/066* (2013.01); *C09D 133/08* (2013.01); *B05D 7/02* (2013.01); *C08L 1/28* (2013.01); *Y10T 428/31551* (2015.04); *Y10T 428/31562* (2015.04); *Y10T 428/31576* (2015.04)

(58) Field of Classification Search
CPC .................................. A47G 7/06; A01G 9/021
USPC ........................................................ 428/34.1
See application file for complete search history.

(56) References Cited

FOREIGN PATENT DOCUMENTS

CN          1559978     *  1/2005

OTHER PUBLICATIONS

Translation of abstract of CN 1559978, Jan. 5, 2005. (Year: 2005).*

* cited by examiner

*Primary Examiner* — Hui H Chin
(74) *Attorney, Agent, or Firm* — Tsz Lung Yeung

(57) ABSTRACT

An imitation ceramic vase manufactured by a method which includes the following steps. (1) Applying a primer layer material on a vase made by a non-ceramic material, and letting the primer layer material to dry. (2) Applying at least one layer of first middle layer material on the primer layer material on the non-ceramic material vase. (3) Applying at least a layer of second middle layer material on the first middle layer material, and letting the second middle layer material to dry, the second middle layer material having a color which is different from that of the first middle later material. (4) Applying a surface layer material on at least one of the first middle layer material and the second middle layer material, and letting the surface layer material to dry. The surface layer material is a polyurethane imitating porcelain surface coating or an ultraviolet imitating porcelain surface coating.

15 Claims, 4 Drawing Sheets

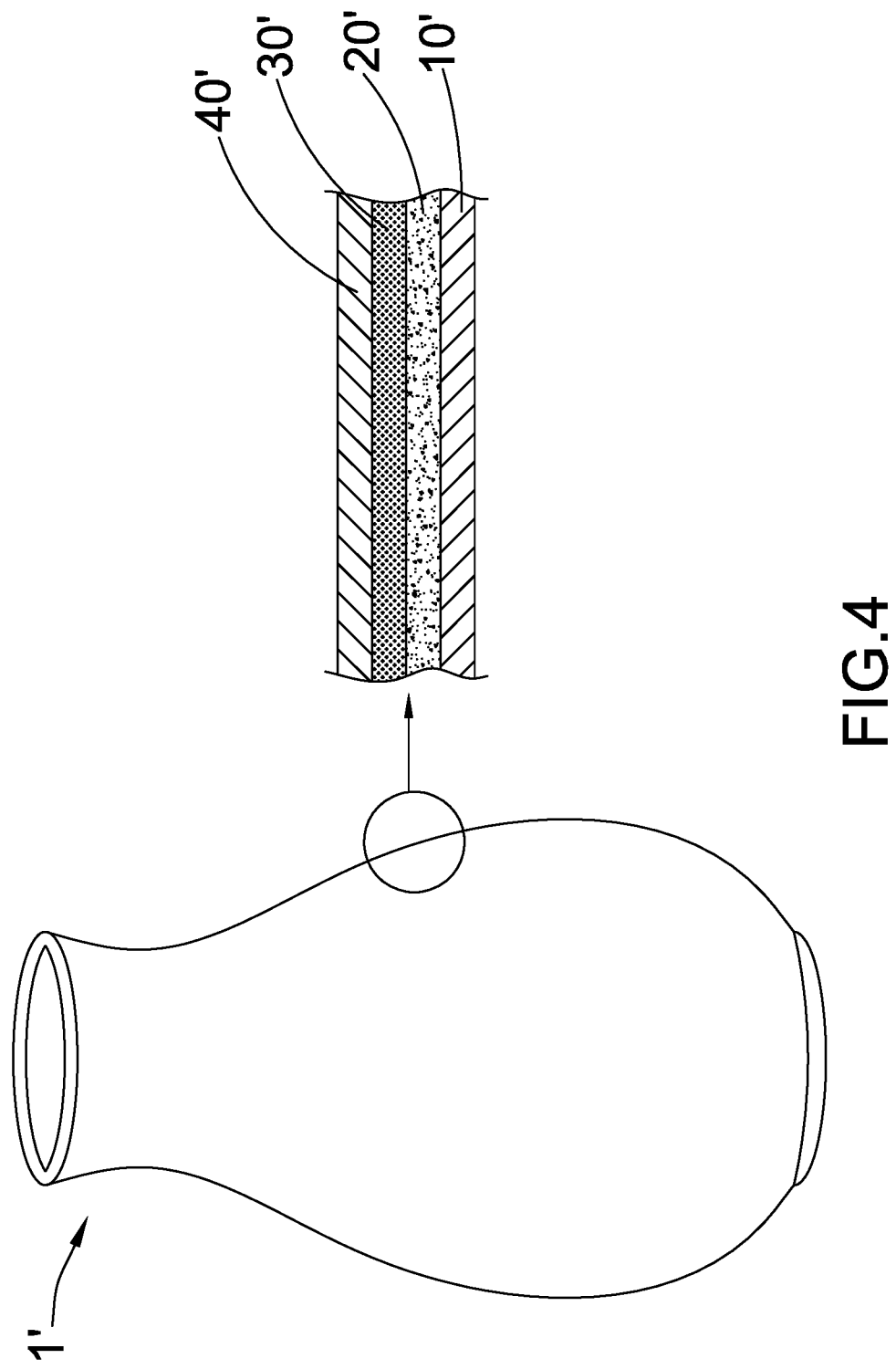

VASE ARTICLE WITH IMITATIVE CERAMIC EFFECT

BACKGROUND OF THE PRESENT INVENTION

Field of Invention

The present invention relates to a vase, and more particularly to a vase or a flowerpot made of plastic, plastic soil, poly or other similar non-ceramic material and undergoes a coating process for generating a superior imitating ceramic effect on the vase.

Description of Related Arts

Ceramic raw materials include kaolin, clay, porcelain stone, china clay, coloring agent, blue and white porcelain material, organic soil such as lime glaze and lime-alkali glaze. Ceramic materials have excellent mechanical properties, high level of abrasion resistance and are easy to clean. Therefore, ceramic materials are widely used by people and become an important material in people's lives and in industrial production. The superior performance of ceramic articles is originated from its unique processing method which involves milling, molding and sintering process. However, when society develops over time and people have increased awareness to environmental protection, problems of resource consumption, energy consumption and environmental damaging effect associated with the production process of ceramic articles are increasingly important issues to us. Accordingly, a new area concerning exploitation, production and application of materials in relation to environmental protection is being rapidly developed.

During the early stage of development, the major material of paint coating is vegetable oil and therefore paint coating is named as "paint". The paint coating materials, which are either the traditional paint materials made with natural raw materials, or the synthetic industrial product in modern development, belong to organic chemical polymer material which is a coating of macromolecular compound. The traditional paint coating material is very difficult to be decomposed in the soil, and eventually will cause a very serious pollution hazards to environment. In addition, because regular paint only has such properties as anticorrosion, waterproof, oil-proof, chemical resistant, light resistant and temperature resistant, a truly imitating ceramic effect is therefore not achieved.

SUMMARY OF THE PRESENT INVENTION

Certain variations of the present invention provide a paint coating process for an imitation ceramic vase in which the paint coating is readily decomposable in soil and therefore is environmentally friendly while the paint coating can be applied onto a wide variety of materials and produce a superior imitating ceramic effect.

Certain variations of the present invention provide an imitation ceramic vase which is arranged to undergo an environmental friendly paint coating process so as to produce a superior imitating ceramic effect.

In one aspect of the present invention, it provides an imitation ceramic vase, being manufactured by the steps of:

(1) applying a primer layer material on a vase made by a non-ceramic material, and letting the primer layer material on the vase to dry;

(2) applying at least one layer of first middle layer material on the primer layer material on the non-ceramic material vase, the middle layer material being applied on at least a portion of the vase;

(3) applying at least a layer of second middle layer material on the first middle layer material, and letting the second middle layer material to dry, the second middle layer material having a color which is different from that of the first middle later material, and (4) applying a surface layer material on at least one of the first middle layer material and the second middle layer material, and allowing the surface layer material to dry, the surface layer material being a polyurethane imitating porcelain surface coating or an ultraviolet imitating porcelain surface coating to form an imitation ceramic vase having an imitation ceramic effect.

In another aspect of the present invention, it provides a method of manufacturing an imitation ceramic vase, comprising the steps of:

(1) applying a primer layer material on a vase made by a non-ceramic material, and letting the primer layer material on the vase to dry;

(2) applying at least one layer of first middle layer material on the primer layer material on the non-ceramic material vase, the middle layer material being applied on at least a portion of the vase;

(3) applying at least a layer of second middle layer material on the first middle layer material, and letting the second middle layer material to dry, the second middle layer material having a color which is different from that of the first middle later material, and (4) applying a surface layer material on at least one of the first middle layer material and the second middle layer material, and allowing the surface layer material to dry, the surface layer material being a polyurethane imitating porcelain surface coating or an ultraviolet imitating porcelain surface coating to form an imitation ceramic vase having an imitation ceramic effect.

This summary presented above is provided merely to introduce certain concepts and not to identify any key or essential features of the claimed subject matter.

BRIEF DESCRIPTION OF THE DRAWINGS

FIG. 4 is a schematic diagram of an imitation ceramic vase according to a second preferred embodiment of the present invention.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

Figure 1:
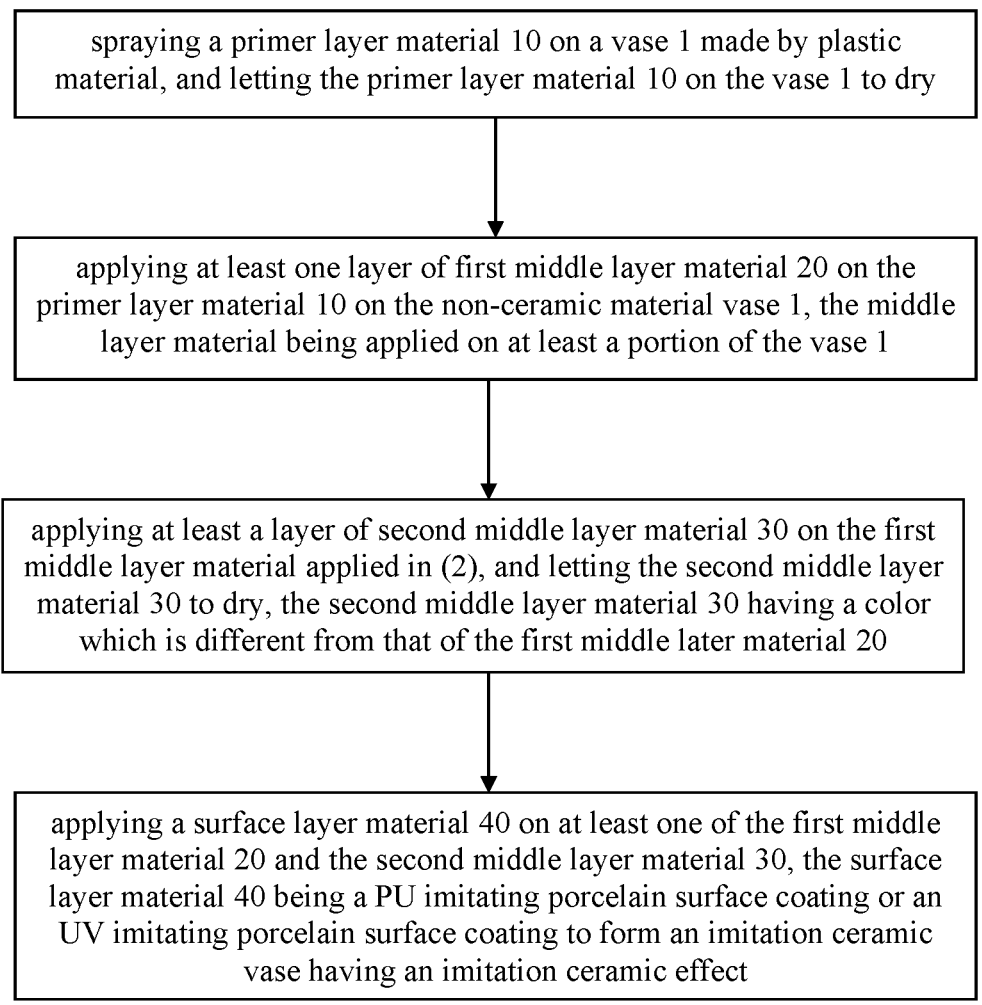
FIG. 1 is a block diagram of a method of manufacturing an imitation ceramic vase according to a first preferred embodiment of the present invention.
Figure 2:
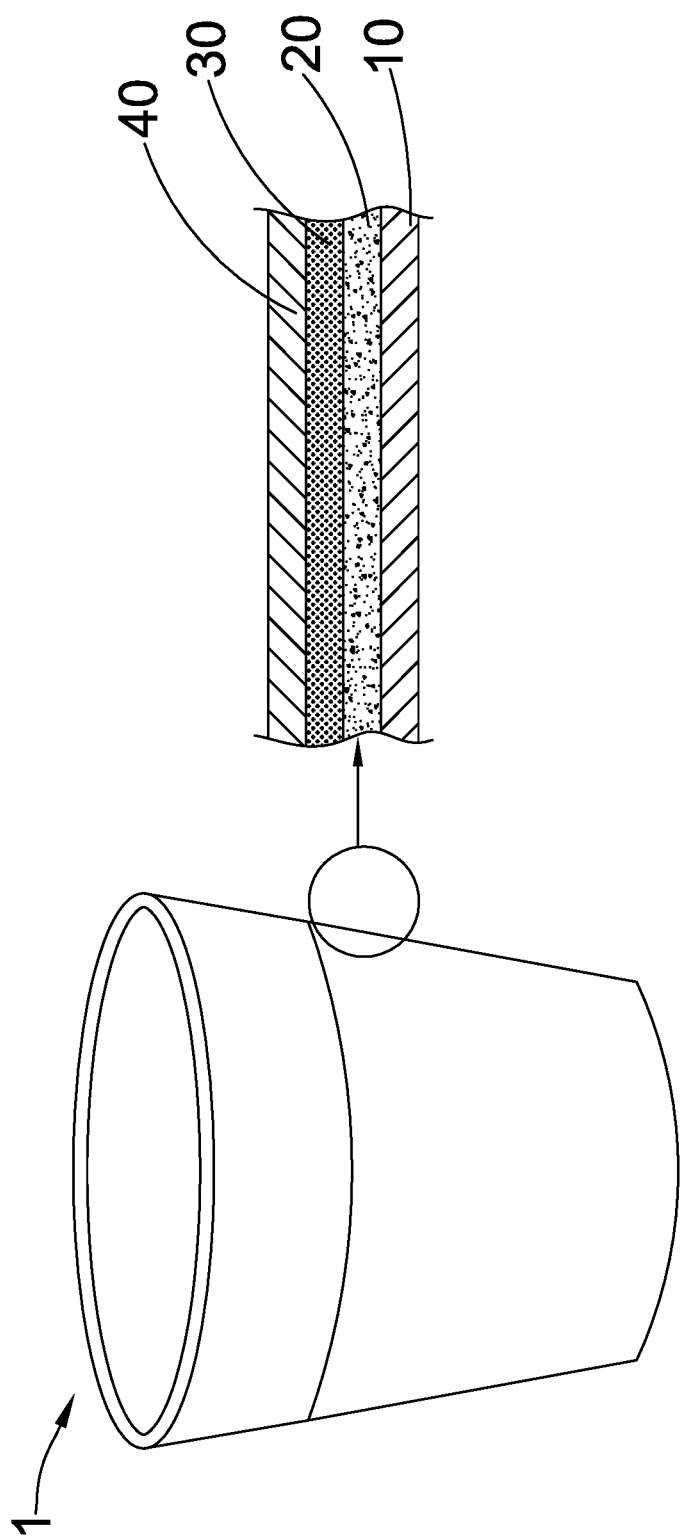
FIG. 2 is a schematic diagram of an imitation ceramic vase according to a first preferred embodiment of the present invention.

Referring to FIG. 1 to FIG. 2 of the drawings, a block diagram of an imitation ceramic vase or a flowerpot and its manufacturing method according to first preferred embodiment of the present invention is illustrated. Broadly, an imitation ceramic vase may be manufactured by a method which may comprise the steps of:

(1) spraying a primer layer material 10 on a vase 1 made by a non-ceramic material, and letting the primer layer material 10 on the vase 1 to dry;

(2) applying at least one layer of first middle layer material 20 on the primer layer material 10 on the non-ceramic material vase 1, the middle layer material being applied on at least a portion of the vase 1; and (3) applying at least a layer of second middle layer material 30 on the first middle layer material applied in (2), and letting the second middle layer material 30 to dry, the second middle layer material 30 having a color which is different from that of the first middle later material 20 applied in (2), and (4) applying a surface layer material 40 on at least one of the first middle layer material 20 and the second middle layer material 30, the surface layer material 40 being a PU imitating porcelain surface coating or an UV imitating porcelain surface coating to form an imitation ceramic vase having an imitation ceramic effect.

In the first preferred embodiment of the present invention, the vase may be originally made of plastic material. Examples may include polypropylene (PP), polyvinyl chloride (PVC), polyethylene (PE), acrylonitrile butadiene styrene (ABS), polycarbonate (PC), and ethylene-vinyl acetate copolymer (EVA). In step (1) above, the primer layer material may be sprayed onto a plastic vase. The primer layer material may comprise the following ingredients by weight: approximately 5% to 10% (preferably 8%) of butyl acetate, approximately 5% to 10% (preferably 6%) of ethyl acetate, approximately 50% to 60% (preferably 54%) of thermosetting acrylic resin, approximately 3% to 10% (preferably 6%) of propylene glycol methyl ether acetate (PG-MEA), approximately 1% to 5% (preferably 3%) of solvent-based wetting and dispersing agent, approximately 1% to 2% (preferably 1%) of anti-settling agent, approximately 0.1% to 0.5% (preferably 0.4%) of organic silica anti-foaming agent, and approximately 10% to 30% (preferably 18%) of a preset primer layer pigment. The next step is performed after the primer layer material is dried. If the room temperature is ≥20° C., the time required for natural drying may be approximately 40 minutes.

In step (2) above, the first middle layer material 20 may be sprayed or brushed on at least a portion of the primer layer material 10. In practice, the middle layer material 20 may be sprayed or brushed onto the entire or a portion of the plastic vase 1. The first middle layer material 20 is a water-based imitating porcelain coating, wherein the water-based imitating porcelain coating may comprise the following major water-based middle layer ingredients by weight: approximately 20% to 30% (preferably 25%) of pure water, approximately 0.1% to 0.5% (preferably 0.3%) of water-based organic silica anti-foaming agent, approximately 0.1% to 1% (preferably 0.5%) of water-based wetting and dispersing agent, approximately 0.1% to 0.5% (preferably 0.4%) of water-based mildew resistant agent, approximately 0.1% to 0.5% (preferably 0.3%) of water-based anticorrosive agent, approximately 3% to 10% (preferably 5%) of precipitated calcium carbonate, approximately 0.1% TO 0.5% (preferably 0.4%) of ethyl cellulose, approximately 3% to 10% (preferably 7%) of talcum powder, approximately 10% to 20% (preferably 15%) of titanium dioxide rutile, approximately 30% to 50% (preferably 37%) of acrylic copolymer emulsion, approximately 0.1% to 0.5% (preferably 0.3%) of water-based organic silica anti-foaming agent, approximately 0.5% to 2% (preferably 0.9%) of coalescing agent, and approximately 1% to 5% (preferably 3%) of glycol.

Based on the configuration of the vase 1, the number of times of spraying or brushing the first middle layer material can be determined. It could be one time or more than one time. Then, the next step may be performed after the first middle layer material 20 is dried. Alternatively, the next step may be performed directly. If the humidity is ≤70% and the room temperature is ≥20° C., the time required for natural drying may be approximately 15 hours.

In step (3) above, at least one layer of second middle layer material 30 may be sprayed or brushed on the first middle layer material 20. The second middle layer material 30 may have a color which is different from that of the first middle layer material 30. The ingredients of the second middle layer material 30 is identical to that of the first middle layer material 20. They only differ in color. Based on the configuration and effect of the vase 1, the number of times of spraying or brushing the middle layer material with another color can be determined. Then, the next step is performed after the first middle layer material 20 and the second middle layer material 30 on the vase 1 is dried. If the humidity is ≤70% and the room temperature is ≥20° C., the time required for natural drying may be approximately 16 hours.

In step (4) above, the surface layer material 40 may be sprayed on the first middle layer material 20 and/or the second middle layer material 30. The polyurethane (PU) imitating porcelain surface coating may comprise a major surface layer composition and a curing agent, wherein the major surface layer composition may comprise the following percentages of the major surface layer ingredients by weight: approximately 5% to 10% (preferably 7%) of butyl acetate, approximately 4% to 10% (preferably 6%) of xylene, approximately 80% to 85% (preferably 82%) of acrylic polyol resin, approximately 4% to 8% (preferably 5%) of propylene glycol monomethyl ether acetate, approximately 0.5% to 2% (preferably 0.8%) of organic silica leveling agent, and approximately 0.1% to 0.5% (preferably 0.4%) of organic silica anti-foaming agent. The curing agent may comprise the following percentages of the major curing agent ingredients by percentage: approximately 15% to 30% (preferably 20%) of butyl acetate, approximately 15% to 30% (preferably 18%) of xylene, and approximately 40% to 65% (preferably 45%) of isocyanate curing agent. Once the surface layer material 40 is dried, the vase 1 may become an imitation ceramic vase with superior imitating ceramic effect.

Figure 3:
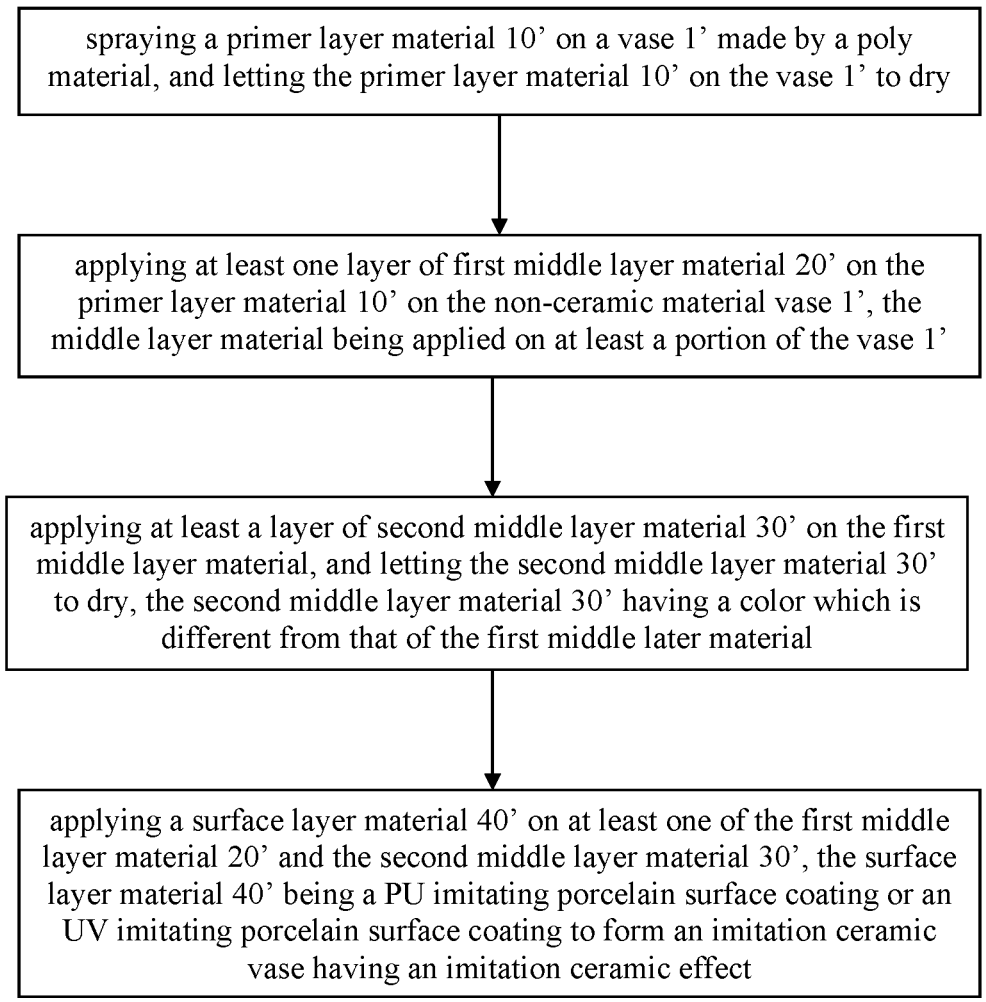
FIG. 3 is a block diagram of a method of manufacturing an imitation ceramic vase according to a second preferred embodiment of the present invention.

Referring to FIG. 3 to FIG. 4 of the drawings, a block diagram of an imitation ceramic vase and its manufacturing method according to a second preferred embodiment of the present invention is illustrated. The second preferred embodiment is similar to the first preferred embodiment, except the vase 1 may be made of poly material (methyl methacrylate). Broadly, the imitation ceramic vase may be manufactured by a method which may comprise the steps of:

(1') spraying a primer layer material 10' on a vase 1' made by a non-ceramic material, and letting the primer layer material 10' on the vase 1' to dry;

(2') applying at least one layer of first middle layer material 20' on the primer layer material 10' on the non-ceramic material vase 1', the middle layer material being applied on at least a portion of the vase 1'; and (3') applying at least a layer of second middle layer material 30' on the first middle layer material applied in (2), and letting the second middle layer material 30' to dry, the second middle layer material 30' having a color which is different from that of the first middle later material 20' applied in (2), and (4') applying a surface layer material 40' on at least one of the first middle layer material 20' and the second middle layer material 30', the surface layer material 40' being a PU imitating porcelain surface coating or an UV imitating porcelain surface coating to form an imitation ceramic vase having an imitation ceramic effect.

In step (1') above, the primer layer material 10' may be sprayed on the vase 1 made of poly. The next step may be performed after the primer layer material 10' is dried. The primer layer material may comprise the following percentage of ingredients by weight: approximately 9% of butyl acetate, approximately 10% of ethyl acetate, approximately 7% of xylene, approximately 20% of ethyl cellulose, approximately 25.7% of acrylic resin, approximately 5% of propylene glycol monomethyl ether acetate, approximately 2% of solvent-based wetting and dispersing agent, approximately 1% of bentonite, approximately 0.3% of organic silica anti-foaming agent, approximately 15% of a preset primer layer pigment, and approximately 5% of talcum powder. If the room temperature is <20° C., the time required for natural drying may be approximately 1.5 hours.

In step (2') above, the first middle layer material 20' is sprayed or brushed onto the entire or a portion of the poly vase 1. Based on the configuration and the desirable effect of the vase, the number of times of spraying or brushing the first middle layer material 20' can be carried. It could be one time or more than one time. Then, the next step is performed after the first middle layer material 20' is dried. The first middle layer material is an oil-based imitating porcelain coating which may comprise the following percentage of major oil-based middle layer ingredients by weight: approximately 5% to 10% (preferably 7%) of butyl acetate, approximately 5% to 10% (preferably 6%) of ethyl acetate, approximately 20% to 30% (preferably 25%) of ethyl cellulose, approximately 20% to 40% (preferably 30%) of acrylic resin, approximately 5% to 10% (preferably 7%) of propylene glycol methyl ether acetate (PGMEA), approximately 1% to 5% (preferably 3%) of solvent-based wetting and dispersing agent, approximately 0.5% to 3% (preferably 2%) of anti-settling agent, approximately 0.1% to 0.5% (preferably 0.4%) of organic silica anti-foaming agent, and approximately 10% to 20% (preferably 14%) of a preset middle layer pigment. If the humidity is ≥70% and the room temperature is ≤20° C., the time required for natural drying may be 28 hours. The next step is performed after the first middle layer material 20' is dried.

In step (3') above, the ingredients of the second middle layer material 30' is the same as that of the first middle layer material 20'. They only differ in color. Based on the configuration and effect of the vase, the number of times of spraying or brushing the middle layer material with another color can be determined. Then, the next step is performed after the paint on the vase is dried. If the humidity is ≥70% and the room temperature is ≤20° C., the time required for natural drying is 26 hours.

In step (4') above, the UV imitating porcelain surface coating may be sprayed onto the first middle layer material 20' and/or the second middle layer material 30'. The UV imitating porcelain surface coating may comprise the following percentage of ingredients by weight: approximately 15% to 25% (preferably 18%) of ethyl acetate, approximately 0.5% to 2% (preferably 0.8%) of organic silica leveling agent, approximately 1% to 5% (preferably 3%) of photo-initiator, approximately 2% to 5% (preferably 4%) of photo-sensitizer, approximately 6% to 12% (preferably 8%) of amine-modified diacrylate, approximately 15% to 30% (preferably 18%) of hexa-functional urethane acrylate, approximately 15% to 25% (preferably 20%) of bifunctional urethane acrylate, approximately 10% to 20% (preferably 14%) of trifunctional urethane acrylate, and approximately 5% to 15% (preferably 8%) of organic amine resin. Once the UV imitating porcelain surface coating is dried, the resulting product may become an imitation ceramic vase with superior imitating ceramic effect.

The imitation ceramic vase of the present invention described above utilizes non-ceramic material and the first middle layer material 20 (20'), the second middle layer material 30 (30'), and the surface layer material 40 (40') to form a vase which imitate the effect of a ceramic vase. Each of the first middle layer material 20 (20'), the second layer material 30 (30') and the surface layer material 40 (40') may have color patterns which resemble the color effect of a ceramic vase or flowerpot. Since the vase 1 (1') may be made of non-ceramic material, it can be easily manufactured through traditional method such as injection molding. Mass production is also possible. The resulting imitation ceramic vase may resemble conventional ceramic vase in term of brightness, rigidity, hardness, material and color saturation, and color glazing effect.

Moreover, in steps (4) and (4') above, the UV imitating porcelain surface coating may be dried under normal temperature and may be cured by ultraviolet. This is in stark contrast with traditional ceramic manufacturing procedures in which ceramic vases or flowerpots may need to be manufactured under very high temperature (such as 800° C. to 1000° C.) for an extended period of time (2.5 to 3 hours). These procedures for traditional ceramic flowerpots or vases are extremely time-consuming and ineffective as compared to the manufacturing method of the present invention.

It is worth mentioning that the imitation ceramic vase or flowerpot can be used interchangeably.

The weight of the resulting imitation ceramic vase or flowerpot usually weight 10% to 30% of a conventional ceramic vase or flowerpot. This enables ease of transportation and storage of the present invention. The imitation ceramic vase may also be made from non-fragile material so as to avoid accidental damage thereof.

The present invention, while illustrated and described in terms of a preferred embodiment and several alternatives, is not limited to the particular description contained in this specification. Additional alternative or equivalent components could also be used to practice the present invention.

What is claimed is:

1. An imitation ceramic vase, being manufactured by a method comprising the steps of:
   (1) applying a primer layer material on a vase made by a non-ceramic material, and letting said primer layer material on said vase to dry;
   (2) applying at least one layer of first middle layer material on said primer layer material on said non-ceramic material vase, said middle layer material being applied on at least a portion of said vase;
   (3) applying at least a layer of second middle layer material on said first middle layer material, and letting said second middle layer material to dry, said second middle layer material having a color which is different from that of said first middle later material, and
   (4) applying a surface layer material on at least one of said first middle layer material and said second middle layer material, and allowing said surface layer material to dry, said surface layer material being a polyurethane imitating porcelain surface coating or an ultraviolet imitating porcelain surface coating to form an imitation ceramic vase having an imitation ceramic effect, wherein said vase in said step (1) is made of plastic material.

2. The imitation ceramic vase, as recited in claim 1, wherein in said step (1), said primer layer material comprises, in percentage by weight, approximately 5% to 10% of butyl acetate, approximately 5% to 10% of ethyl acetate, approximately 50% to 60% of thermosetting acrylic resin, approximately 3% to 10% of propylene glycol methyl ether acetate, approximately 1% to 5% of solvent-based wetting and dispersing agent, approximately 1% to 2% of anti-settling agent, approximately 0.1% to 0.5% of organic silicon defoamer, and approximately 10% to 30% of a primer layer pigment.

3. The imitation ceramic vase, as recited in claim 2, wherein in said step (1), said primer layer material is allowed to dry for approximately 40 minutes for a room temperature which is greater than 20° C.

4. The imitation ceramic vase, as recited in claim 3, wherein in said step (2) and said step (3), each of said first middle layer material and said second middle layer material comprises, in percentage by weight, approximately 20% to 30% of pure water, approximately 0.1% to 0.5% of water-based organic silicon defoamer, approximately 0.1% to 1% of water-based wetting and dispersing agent, approximately 0.1% to 0.5% of water-based mildew resistant agent, approximately 0.1% to 0.5% of water-based anticorrosive agent, approximately 3% to 10% of precipitated calcium carbonate, approximately 0.1% to 0.5% of ethyl cellulose, approximately 3% to 10% of talcum powder, approximately 10% to 20% of titanium dioxide rutile, approximately 30% to 50% of acrylic copolymer emulsion, approximately 0.1% to 0.5% of water-based organic silicon defoamer, approximately 0.5% to 2% of coalescing agent, and approximately 1% to 5% of glycol.

5. The imitation ceramic vase, as recited in claim 4, wherein in said step (2), said first middle layer is allowed to dry for approximately 15 hours for a room temperature which is greater than or equal to 20° C., and a humidity of less than or equal to 70%.

6. The imitation ceramic vase, as recited in claim 5, wherein in said step (3), said second middle material layer is allowed to dry for approximately 16 hours for a room temperature which is approximately greater than or equal to 20° C., and a humidity which is approximately less than or equal to 70%.

7. The imitation ceramic vase, as recited in claim 6, wherein in said step (4), said polyurethane imitating porcelain surface coating comprises a major surface layer composition and a curing agent, wherein said major surface layer composition comprises, in percentage by weight, approximately 5% to 10% of butyl acetate, approximately 4% to 10% of xylene, approximately 80% to 85% of acrylic polyol resin, approximately 4% to 8% of propylene glycol monomethyl ether acetate, approximately 0.5% to 2% of organic silicon leveling agent, and approximately 0.1% to 0.5% of organic silicon defoamer.

8. The imitation ceramic vase, as recited in claim 7, wherein in said step (4), said curing agent comprises, in percentage by weight, 15% to 30% of butyl acetate, approximately 15% to 30% of xylene, and approximately 40% to 65% of isocyanate curing agent.

9. An imitation ceramic vase, being manufactured by a method comprising the steps of:
(1) applying a primer layer material on a vase made by a non-ceramic material, and letting said primer layer material on said vase to dry;

(2) applying at least one layer of first middle layer material on said primer layer material on said non-ceramic material vase, said middle layer material being applied on at least a portion of said vase;

(3) applying at least a layer of second middle layer material on said first middle layer material, and letting said second middle layer material to dry, said second middle layer material having a color which is different from that of said first middle later material, and (4) applying a surface layer material on at least one of said first middle layer material and said second middle layer material, and allowing said surface layer material to dry, said surface layer material being a polyurethane imitating porcelain surface coating or an ultraviolet imitating porcelain surface coating to form an imitation ceramic vase having an imitation ceramic effect, wherein in said step (1), said vase is made of methyl methacrylate.

10. The imitation ceramic vase, as recited in claim 9, wherein in said step (1), said primer layer material comprises, in percentage by weight, approximately 9% of butyl acetate, approximately 10% of ethyl acetate, approximately 7% of xylene, approximately 20% of ethyl cellulose, approximately 25.7% of acrylic resin, approximately 5% of propylene glycol monomethyl ether acetate, approximately 2% of solvent-based wetting and dispersing agent, approximately 1% of bentonite, approximately 0.3% of organic silicon defoamer, approximately 15% of primer layer pigment, and approximately 5% of talcum powder.

11. The imitation ceramic vase, as recited in claim 10, wherein in said step (1), said primer layer material is allowed to dry for approximately 1 hour and 30 minutes for a room temperature which is less than 20° C.

12. The imitation ceramic vase, as recited in claim 11, wherein in said step (2), said first middle layer material comprises, in percentage by weight, approximately 5% to 10% of butyl acetate, approximately 5% to 10% of ethyl acetate, approximately 20% to 30% of ethyl cellulose, approximately 20% to 40% of acrylic resin, approximately 5% to 10% of propylene glycol methyl ether acetate, approximately 1% to 5% of solvent-based wetting and dispersing agent, approximately 0.5% to 3% of anti-settling agent, approximately 0.1% to 0.5% of organic silicon defoamer, and approximately 10% to 20% of a middle layer pigment.

13. The imitation ceramic vase, as recited in claim 12, wherein in said step (2), said first middle layer material is allowed to dry for approximately 28 hours for a room temperature which is less than or equal to 20° C., and a humidity which is greater than or equal to 70%.

14. The imitation ceramic vase, as recited in claim 13, wherein in said step (3), said second middle layer material is allowed to dry for approximately 26 hours for a room temperature which is less than or equal to 20° C., and a humidity which is greater than or equal to 70%.

15. The imitation ceramic vase, as recited in claim 14, wherein in said step (4), said ultraviolet imitating porcelain surface coating comprises, in percentage by weight, approximately 15% to 25% of ethyl acetate, approximately 0.5% to 2% of organic silicon leveling agent, approximately 1% to 5% of photo-initiator, approximately 2% to 5% of photo-sensitizer, approximately 6% to 12% of amine-modified diacrylate, approximately 15% to 30% of hexa-functional urethane acrylate, approximately 15% to 25% of bifunctional urethane acrylate, approximately 10% to 20% of trifunctional urethane acrylate, and approximately 5% to 15% of organic amine resin.

* * * * *